United States Patent [19]

Gee

[11] 4,076,974
[45] Feb. 28, 1978

[54] CURRENT CONTROL DEVICE AND METHOD

[75] Inventor: Edwin Gee, St. Charles, Ill.

[73] Assignee: Technitron, Inc., Carol Stream, Ill.

[21] Appl. No.: 641,434

[22] Filed: Dec. 17, 1975

[51] Int. Cl.² ............................................. B23K 11/24
[52] U.S. Cl. .................................... 219/108; 219/114; 323/19
[58] Field of Search .................. 219/108, 114, 115; 323/17, 18, 19, 24, 22 SC; 324/102

[56] References Cited

U.S. PATENT DOCUMENTS

| | | | |
|---|---|---|---|
| 2,961,596 | 11/1960 | Rockafellow | 323/18 |
| 3,176,215 | 3/1965 | Kusko | 323/24 |
| 3,501,771 | 3/1970 | Miller et al. | 323/24 X |
| 3,694,615 | 9/1972 | Brandeis | 219/114 |
| 3,715,651 | 2/1973 | Ott | 323/24 X |
| 3,875,367 | 4/1975 | Tanaka | 219/108 X |
| 3,936,726 | 2/1976 | Kelley, Jr. | 323/24 |
| 3,942,041 | 3/1976 | Morriss | 323/24 X |
| 4,004,214 | 1/1977 | Evans | 323/19 |

FOREIGN PATENT DOCUMENTS 233,550   4/1959   Australia .............................. 219/114

Primary Examiner—J. V. Truhe
Assistant Examiner—Clifford C. Shaw
Attorney, Agent, or Firm—Allegretti, Newitt, Witcoff & McAndrews

[57] ABSTRACT

A circuit for improved control of current for use in conjunction with an inductive load, for example, a transformer in a welding operation. The circuit of this invention is adapted to maintain the percentage of total RMS current demand directly proportional to a reference signal. A nonlinear control signal generator is provided to supply a control signal which is compared to the reference signal to operate a switch means for controlling the flow of current in the inductive load.

7 Claims, 12 Drawing Figures

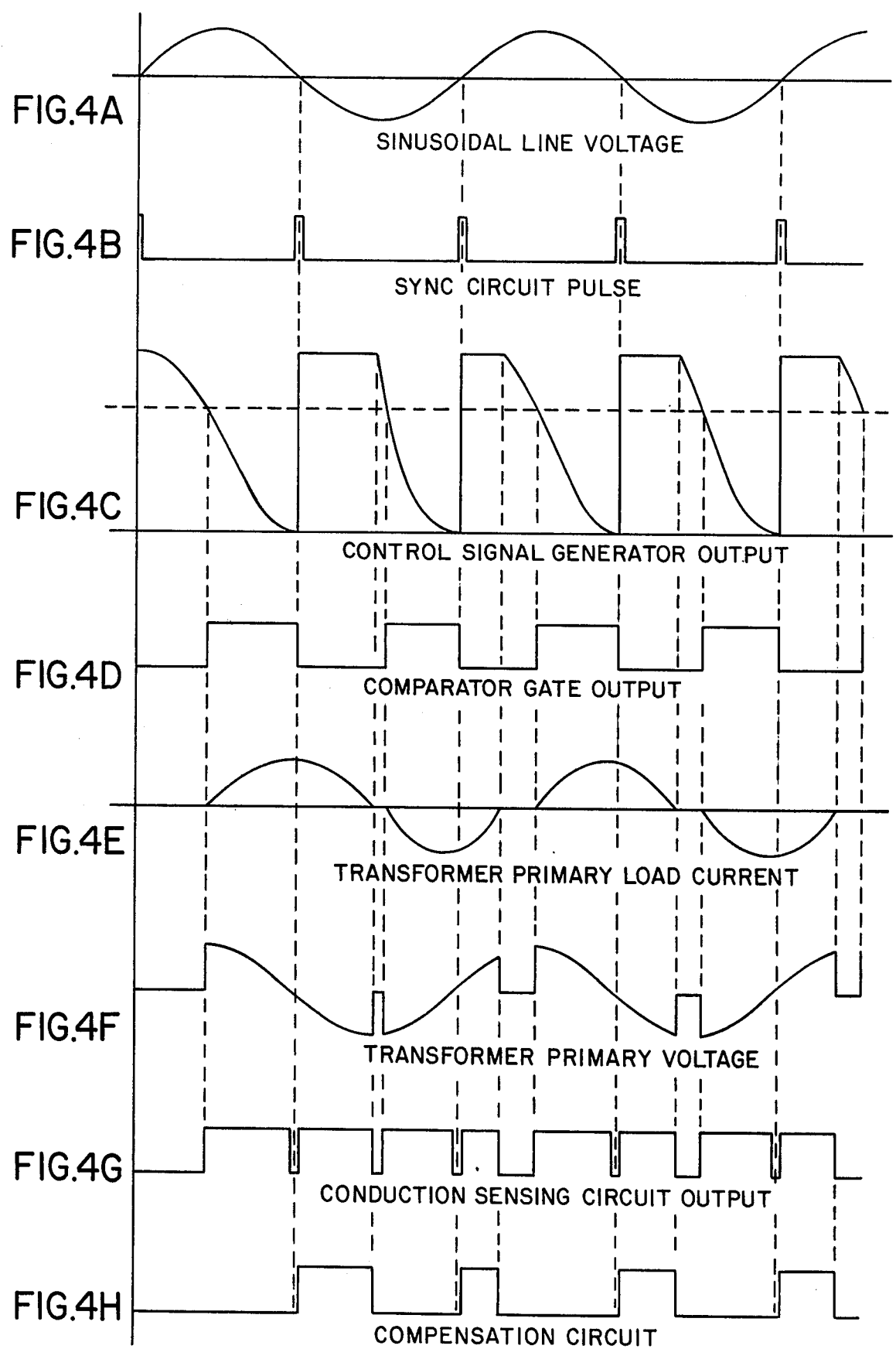

CURRENT CONTROL DEVICE AND METHOD

BACKGROUND OF THE INVENTION

The present invention is generally related to a circuit for controlling a current in an inductive load supplied by a sinusoidally varying voltage such that the true RMS value as a percentage of total demand current is maintained directly proportional to a reference signal.

One specific application of this invention is directed towards control of current in the primary winding of a transformer utilized in an AC welder.

PRIOR ART

The present techniques for controlling the primary current in welders include the use of RC timing circuits and/or digital counting circuits which act to delay turn-on of a switch means connected between the AC voltage source and the primary winding in order to regulate the amount of current supplied to the load. The delay in turn-on of the switch means may be adjusted either by a rheostat or by digital switch settings. One example of a prior art device is shown in U.S. Pat. No. 3,452,214 to Martin which discloses a digital wave form division for power control. In either case, the percent of total demand current as measured in RMS values has not been maintained directly proportional to a reference signal since there is a nonlinear relationship between the necessary time delay and the percent of true RMS demand current. Also, this relationship can vary with the variation of the system power factor. This power factor can vary when a ferrous metal to be welded is placed within the secondary circuit during the welding process.

SUMMARY OF THE INVENTION

The present invention is related to an improvement for controlling current supplied from a sinuoidally varying voltage source to an inductive load. The improvement includes a means for generating a nonlinear control signal in synchronism with the zero crossings of the signal from the AC voltage source, said control signal having a convex shape during a first portion thereof and a concave shape during a second portion thereof, a switch means for permitting current flow between said AC voltage source and said load during the time between actuation of said switch means and the next zero crossing of the current through said switch means, and means for comparing the nonlinear control signal with a reference signal and for generating a switching signal to operate said switch means indicative of whether or not the control signal is less than the reference signal.

In the presently preferred embodiment of this invention, the means for generating the nonlinear control signal includes first and second voltage follower connected amplifiers, an energy storage means between the output of the first amplifier and the input of the second amplifier, resistive means connected between the output of the second amplifier and the input of the first amplifier, a second energy storage means connected between the input of the first amplifier and a reference voltage, switch means in synchronism with the AC voltage source zero crossings for discharging said first energy storage means and for charging said second energy storage means, and a resistor connected between the input of said second amplifier and a fixed predetermined source of voltage wherein the output of the first amplifier is also connected to the comparator means.

As an additional feature of the present invention, there is also provided a conduction sensing circuit which develops a signal representative of whether or not conduction is occurring in the primary of a transformer used for delivering power to a load. The conduction sensing circuit in cooperation with signals developed from the comparator means and from a line synchronizing circuit operates to clamp the voltage on the second energy storage means and thus on the control signal generating means during the time between initiation of a pulse from the synchronizing circuit and the completion of a half cycle of current conduction.

Accordingly, it is an object of the present invention to provide an improved means for controlling the current in an AC powered inductive load.

It is also an object of the present invention to provide such an improvement in which the RMS current in the inductive load may be controlled such that current expressed as a percentage of total demand current is maintained directly proportional to a reference signal.

It is further an object of the present invention to provide such a circuit which will operate regardless of variations in the system power factor.

It is also an object of the present invention to provide an improved means for controlling current in an AC powered inductive load which will lend itself readily to remote control, with or without feedback, including for example, line voltage compensation, constant current control, or constant voltage control.

These and other objects, advantages and features of the present invention will become more apparent by reference to the detailed description of the preferred embodiment which follows.

BRIEF DESCRIPTION OF THE DRAWINGS

There follows a brief description of the drawings showing a presently preferred embodiment of the present invention wherein like numerals refer to like elements and wherein:

FIGS. 4A–4H are idealized graphs of signals from various points of the circuit of FIG. 2.

DETAILED DESCRIPTION OF THE PREFERRED EMBODIMENT

Figure 1:
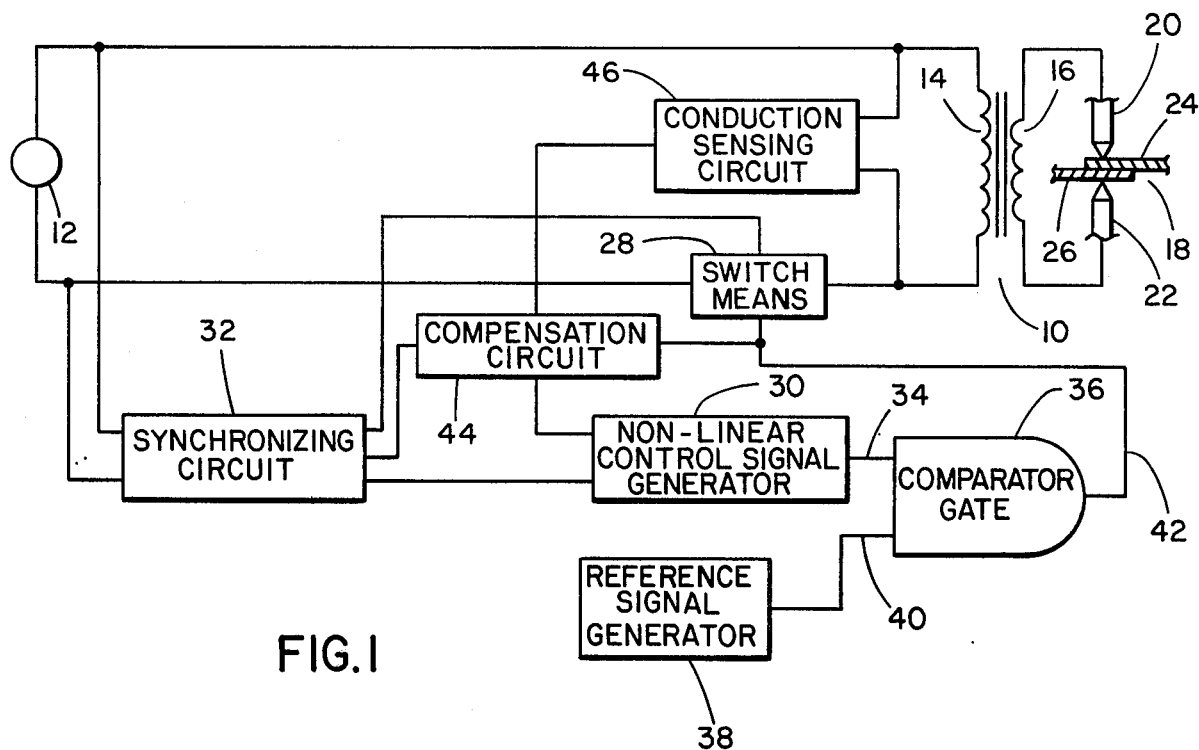
FIG. 1 is a block diagram of a presently preferred embodiment of the present invention.

Referring now to FIG. 1 of applicant's invention, a transformer 10 is shown powered by an AC voltage source 12. The transformer 10 includes a primary winding 14 and a secondary winding 16. The secondary winding 16 is connected to a load 18 which includes welding electrodes 20 and 22 positioned to weld lapped members 24 and 26.

A switch means 28 is provided in series with the primary winding 14 between the winding 14 and the voltage source 12. In the preferred embodiment the switch means may be an SCR type switch which, when triggered, permits flow of current therethrough until the next zero crossing of the current passing through the switch.

A nonlinear control signal generator 30 is provided and is synchronized with the zero crossings of the voltage signal from voltage source 12 by means of a synchronizing circuit 32. Synchronizing circuit 32 is connected between the voltage source 12 and the nonlinear control generator 30. The output of the control signal generator 30 is supplied to one input terminal 34 of a comparator 36.

A reference signal generator 38 is also provided and the output thereof is connected to a second input terminal 40 of the comparator gate 36. The reference signal generator 38 may be an independent signal generator or it may be merely a conductor for a feedback signal which is representative of varying line voltage, or varying load current or voltage.

The comparator gate 36 operates as a means for comparing the signal from the control signal generator with that from the reference signal generator and for generating a switching signal on output terminal 42 of the comparator gate 36 representative of which input signal is greater. Output terminal 42 is connected to the switch means 28 in order to trigger the switch means 28. In the preferred embodiment of this invention, the comparator gate delivers a switching signal to the switch means 28 when and only when the signal from the reference signal generator 38 is greater than the signal from the control signal generator 30.

In order to accommodate varying power factors which may occur during operation, a compensation circuit 44 is provided and is connected to one input of the control signal generator 30 in order to vary the shape of the output signal from the control signal generator 30 in accordance with the power factor of the circuit. Inputs to the compensation circuit 44 include a conduction sensing circuit 46 and the inverted output from the synchronizing circuit 32. The conduction sensing circuit 46 is connected across the primary 14 of the transformer 10 and generates a signal indicative of the existence of a voltage across the primary 14 which in turn indicates the existence of a variation in the current therethrough.

As will be explained in detail later, the compensation circuit 44 clamps the output of the control signal generator 30 for a predetermined time related to the system power factor. In situations where the power factor of the system will be a constant, the conduction sensing circuit may be replaced by a fixed time delay signal generator which clamps the output of the control signal generator 30 for a predetermined time which is related to the fixed system power factor.

Control Signal Generator

Figure 2:
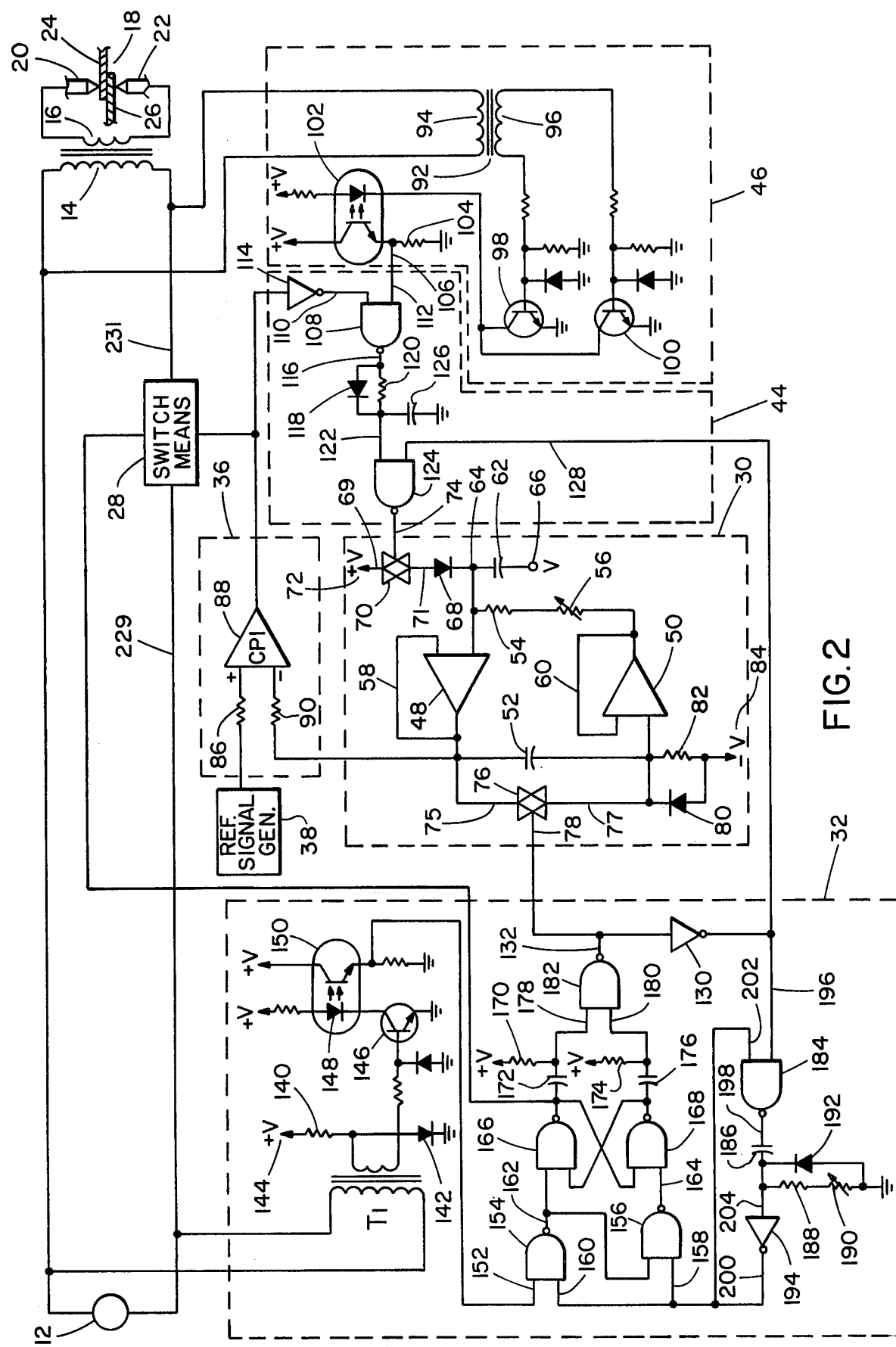
FIG. 2 is a partial schematic diagram of the preferred embodiment of the present invention.

Referring now to FIG. 2, the nonlinear control signal generator 30 will be described in greater detail. The generator 30 includes a first voltage follower connected amplifier 48 and a second voltage follower connected amplifier 50 connected in back to back relationship in order to form a constant current generator, as will be described. The output of amplifier 48 is connected through an energy storage means in the form of a capacitor 52 to the positive input terminal of amplifier 50. The output terminal of amplifier 50 is connected through a fixed resistor 54 in series with a variable resistor 56 to the positive input of amplifier 48.

As can be seen, the output of amplifier 48 is connected through a lead 58 to the negative input thereof. Likewise, the output of amplifier 50 is connected through a lead 60 to the negative input thereof. Since the amplifiers 48 and 50 are connected in voltage follower fashion, the output voltage of amplifier 48 will be the same as that on the positive input of amplifier 48 and the voltage on the positive input of amplifier 50 will be the same as that on the output of amplifier 50. Thus, when the voltage between the output of amplifier 48 and the positive input of amplifier 50 is a constant, an identical constant voltage will be impressed across the output of amplifier 50 and the positive input of amplifier 48 and therefore across the resistor 54 and 56 thus producing a constant current flow therethrough.

A second energy storage means in the form of a capacitor 62 is connected at a node 64 to the positive input of the amplifier 48. Capacitor 62 is connected between the input of amplifier 48 and a source of reference voltage 66. Node 64 is also connected to a diode 68 which in turn is connected through an analog switch 70 to a fixed DC source of voltage 72. The analog switch 70 has a triggering gate 74 which is connected to the compensation circuit 44 and conducting terminals 69 and 71 which conduct when a signal is received on gate 74.

A second analog switch 76 has conducting terminals 75 and 77 connected across the capacitor 52 and a triggering gate 78 connected to the output of the synchronizing circuit 32 as will also be discussed more fully hereafter. A diode 80 and a resistor 82 connected in parallel therewith, are connected between the positive input of amplifier 50 and a second source of DC voltage 84 which is less than the voltage from source 72 and which may be the inverse thereof.

The operation of the nonlinear control signal generator 30 will now be explained with reference to FIG. 2 and the graphs shown in FIGS. 3 and 4 without regard to the effect of the compensation circuit 44. When the sinusoidal line voltage from the AC voltage source 12 passes through zero a pulse signal is formed on the output 132 of the synchronizing circuit 32 and functions to momentarily turn on analog switches 70 and 76 thus permitting conduction through the conducting terminals 69 and 71 of analog switch 70 and the conducting terminals 75 and 77 of analog switch 76. The conduction of analog switch 76 shorts out the voltage across the capacitor 52 and the conduction of analog switch 70 charges capacitor 62 to the level of voltage source 72 through the diode 68.

Figure 3:
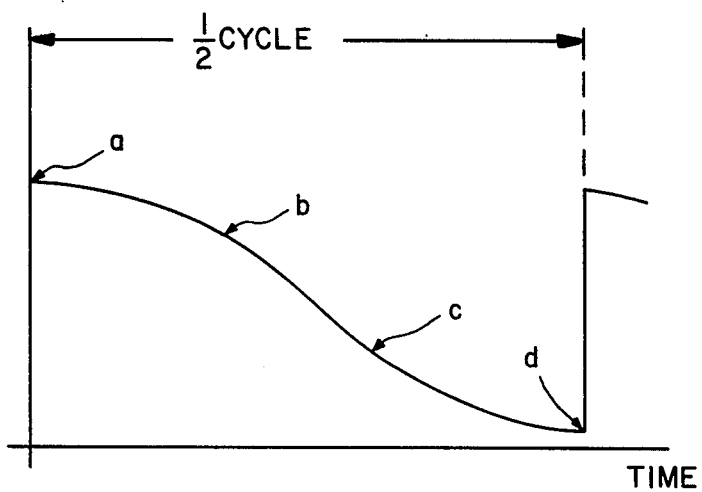
FIG. 3 is an idealized graph of an uncorrected signal from the nonlinear control signal generator.

During the remaining portion of the half cycle of the sinusoidal input voltage from voltage source 12, the output voltage of the nonlinear control signal generator 30 appears as shown in FIG. 3 which corresponds to the first half cycle of FIGS. 4A–4H. As can be seen, the curve has a convex portion between points A and C and a concave portion between points C and D.

Because of the voltage follower characteristic of the amplifier 48, the charged voltage at node 64 of the capacitor 62 is delivered to the output terminal of amplifier 48 which is also the output of the control signal generator 30. Thus the voltage at point A of FIG. 3 is equal to the voltage of the voltage source 72. At this time, since the voltage across capacitor 52 is zero, the voltage across resistors 54 and 56 is also zero and thus no current flows therethrough to discharge the capacitor 62. Thus, the voltage at the output of amplifier 48 temporarily remains at a constant. However, the voltage at the positive input of amplifier 50 is at a level greater than that of voltage source 84, and thus current will flow through the resistor 82 causing the capacitor 52 to charge. As this occurs, the voltage at the positive input of amplifier 50 becomes negative with respect to the voltage at the output of amplifier 48 and this voltage is impressed across resistors 54 and 56 causing current to flow therethrough thus discharging the capacitor 62 and decreasing the voltage level at the output of amplifier 48.

The decrease in voltage at the output of amplifier 48 continues at an increasing rate thus causing the convex shape of the curve between points A and C. This is because the current flow through resistors 54 and 56 (which discharges capacitor 62) is proportional to the voltage across capacitor 52 which is charging at this time.

The voltage at the output of amplifier 48 continues to decrease at an accelerated rate until the time represented by point C on the graph. At this time the circuit begins to operate differently since the capacitor 52 is charged to its maximum level making the voltage at the positive input of amplifier 50 equal to the level of voltage source 84. Diode 80 then conducts and maintains the positive input of amplifier 50 at this level. Since a net voltage still remains across capacitor 52, current continues to flow through resistors 54 and 56, which further decreases the voltage at the positive input and output of amplifier 48. During this time, represented by points C and D on the curve of FIG. 3, the net voltage across capacitor 52 decreases which in turn decreases the current through resistors 54 and 56 causing the capacitor 62 to discharge more slowly and giving the curve shown in FIG. 3 its concave shape between points C and D.

The capacitor 62 continues to discharge until the positive input and output of amplifier 48, the positive input and output of amplifier 50, and the capacitor 62, all decrease to the level of voltage source 84. In practice, the voltage source at 84 is not negative but is maintained at a fixed level below the positive voltage of voltage source 72. Thus the voltage output of amplifier 48 decreases until ultimately leveling out as a constant at the level of source 84. With the appropriate selection of the values of resistors 54 and 56 and 82 and of capacitors 52 and 62, the voltage level of the control signal from generator 30 is made to level off at a constant as the sinusoidal line voltage of the voltage source 12 passes through zero at the end of a half cycle.

The Comparator

As previously explained with respect to FIG. 1, the voltage output from the control signal generator 30 is delivered to a comparator 36 and compared with the signal from a reference signal generator 38. A resistor 86 is provided between the reference signal generator 38 and one input of a comparator amplifier 88 to limit the current flow from the generator 38. A second resistor 90 is provided between the output of the control signal generator 30 and a second input of the comparator amplifier 88 to limit the flow of current from the control signal generator 30.

The output of the comparator amplifier 88 will be at one or the other of two constant voltage levels depending upon whether the voltage from the reference signal generator 38 is greater than, or less than the voltage from the control signal generator 30. When the reference signal generator voltage level exceeds that from the control signal generator 30, the comparator amplifier 88 switches to a first positive condition and when the signal from the control signal generator 30 is in excess of that from the reference signal generator 38, the output from the comparator amplifier 88 drops to a second lower level which may be zero.

Switch Means

Figure 5:
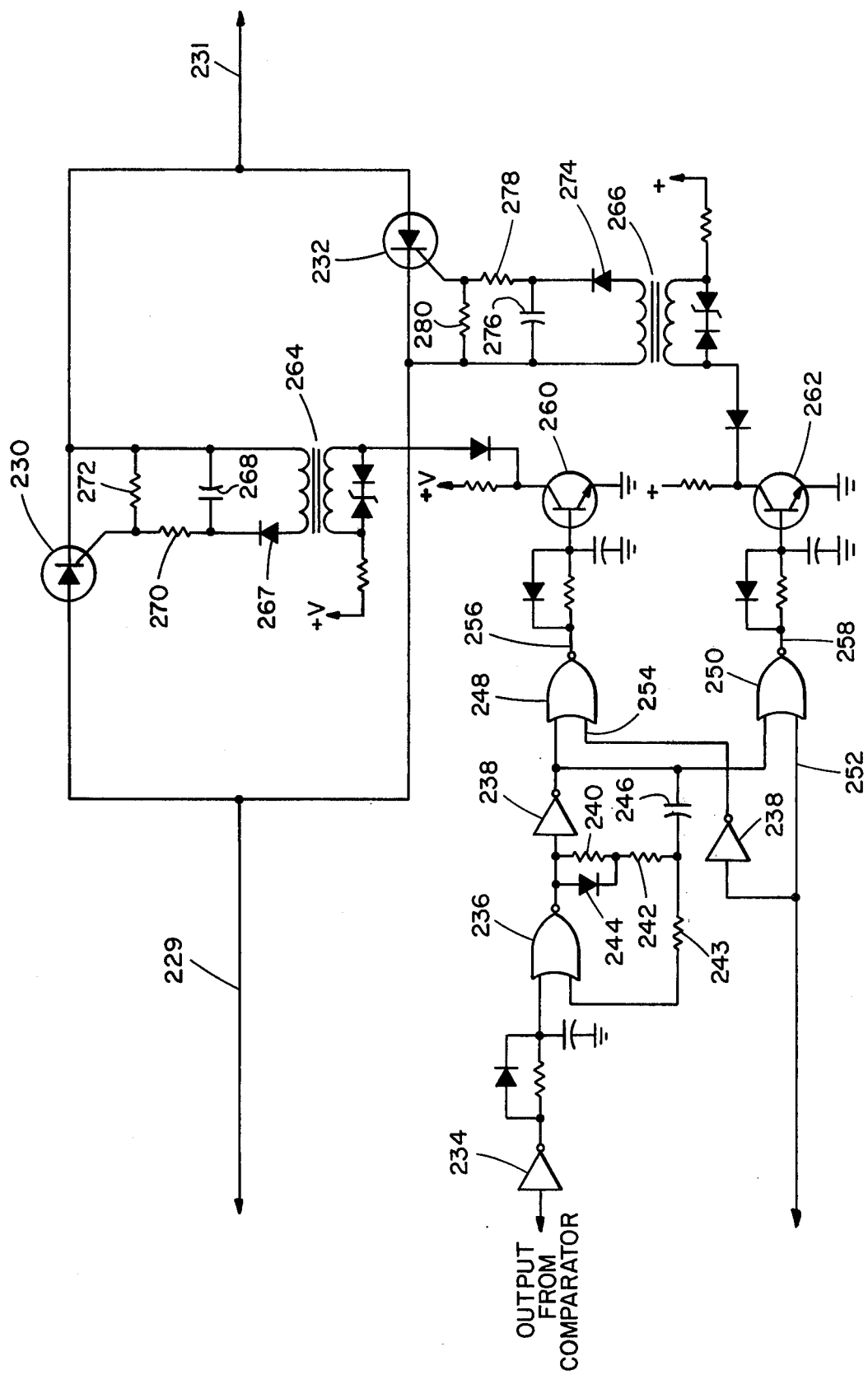
FIG. 5 is a partial schematic diagram of the switch means of this invention.

Switch means 28 is connected through terminals 229 and 231 between voltage source 12 and transformer primary 14. Referring to FIG. 5, the switch means 28 includes two silicon controlled rectifiers 230 and 232 connected in an inverse parallel arrangement so that current may be controlled in either direction.

The output from the comparator gate 36 is inverted by inverter 234 so that a fire pulse oscillator consisting of NOR gate 236, inverter 238, resistors 240, 242 and 243, diode 244 and capacitor 246 may be turned on whenever a positive output signal appears on the output of comparator gate 36. Thus, a series of fire pulses appear on inputs to NOR gates 248 and 250 when the comparator gate is positive.

The NOR gates 248 and 250 separate the fire pulses into positive half cycle and negative half cycle fire pulses by combining with the square wave signal from the synchronizing circuit 32 on NOR gate input 252 or the inverted square wave as formed by inverter 238 on input 254 of gate 248. Thus, NOR gate outputs 256 and 258 provide a series of fire pulses during the positive and negative half cycle of the sinusoidal line voltage whenever the output from the comparator gate 36 is positive.

These two gates 248 and 250 control transistors 260 and 262 such that the fire pulses are impressed on the primaries of isolation pulse transformers 264 and 266. The secondary of each pulse transformer presents the fire pulses to the wave shaping network consisting of diode 267, capacitor 268 and resistors 270 and 272 and diode 274, capacitor 276 and resistors 278 and 280 on the other side. Thus, when fire pulses are generated by transistors 260 and 262 corresponding signals appear between the gate and cathode of SCR's 230 and 232.

These signals cause SCR 230 to turn on and carry current from terminal 229 to terminal 231 during the positive half cycle, and SCR 232 to turn on and carry current from terminal 231 to terminal 229 during the negative half cycle. Once turned on, these SCR's 230 and 232 remain turned on until the current goes to zero.

Referring now to the graphs shown in FIGS. 4A-4H, and particularly to the first half-cycle shown, the reference signal from the generator 38 (the broken line in FIG. 4C) is a constant. Thus, when the voltage from the control signal generator 30 drops below the level of the reference voltage, the output from the amplifier 88 switches to its positive state as shown in FIG. 4D. This triggers the switch means 28 and permits the current to flow therethrough and thus through the primary winding 14 of the transformer 10 for the next half-cycle of current as shown in FIG. 4E. This in turn induces a voltage across the coils of the primary 14 as shown in FIG. 4F.

Compensation and Conduction Sensing Circuits

As previously described, applicant's invention also includes a compensation circuit which enables the control signal to control the RMS value of the current through the primary 14 such that the percent of total demand current is maintained directly proportional to the reference signal from generator 38, even under a varying system power factor. The compensation circuit 44 operates in cooperation with a conduction sensing circuit 46. The input for the conduction sensing circuit 46 is taken from a transformer 92 having a primary 94 in parallel with the primary 14 of transformer 10. As will be described, the conduction sensing circuit thus operates to deliver the voltage across the secondary 96 to the bases of NPN transistors 98 and 100. This in turn causes one or the other of transistors 98 and 100 to conduct when a voltage signal is received across the secondary 96 of transformer 92. When one or the other of the transistors 98 and 100 conduct, a light emitting diode-photosensitive transistor pair 102 is actuated and delivers a signal at the output resistor 104. Thus, as can be seen from the graphs of FIGS. 4F and 4G, an output signal is delivered from the output terminal 106 of the conduction sensing circuit 46 whenever the voltage across the primary 14 of transformer 10 is other than zero. When the voltage across the primary 14 is zero, the output signal on the output terminal 106 of conduction sensing circuit 46 drops to zero since during these conditions no current is conducted through either of the transistors 98 or 100, the light emitting diode-photosensitive transistor pair 102 is not actuated and the voltage across the resistor 104 is zero.

The signal from the output of conduction sensing circuit 46 is delivered to the compensation circuit 44. As can be seen from the more detailed drawing of FIG. 2, the compensation circuit 44 includes a first NAND gate 108 having a first input lead 110 and a second input lead 112. The first input lead 110 is connected through an invertor 114 to the output of the comparator amplifier 88. The signal from the output of the invertor 114 is the inverse of the signal from the output of comparator amplifier 88 which is shown on the graph of FIG. 4D. The NAND gate 108 delivers a positive output at its output terminal 116 at all conditions except when the inputs to both input terminals 110 and 112 are positive ("one") in which case the output of the NAND gate 108 is zero. The output of the NAND gate 108 is delivered through a diode 118 and a resistor 120 to one input 122 of a second NAND gate 124. A capacitor 126 is connected between the output of the resistor 120 and ground. The second input terminal 128 of the NAND gate 124 is connected through an invertor 130 to the output 132 of the synchronizing circuit 32.

The net result of the compensation circuit 44 provides a correction signal at the output of NAND gate 124 which is delivered to the gate terminal 74 of analog switch 70 in order to trigger the switch 70 into conduction and thus clamp the voltage on capacitor 62 at the constant level of the voltage source 72 for whatever period that the switching signal is delivered from NAND gate 124. The compensation circuit logic functions as a means for maintaining the initial voltage level from the control signal generator 30 at a fixed predetermined constant level during the zero crossing of current through the primary 14. Thus, the output of the NAND gate 124 as shown in FIG. 4H of the graph is maintained at a positive ("one") level from the time when a pulse is received from the inverted output of the synchronization circuit 32 until the next zero crossing of current through the primary 14 of the transformer 10.

When the transformer load presents a predominantly inductive load to the incoming sinusoidal line voltage, the load circuit will have a reactive power factor such that the current through the primary will continue to flow after the line voltage zero crossing point. This current which flows beyond the zero voltage crossing point adds to the total RMS current and causes the curve of FIG. 3 to inaccurately reflect this RMS current value. The compensation circuit 44 alters the curve of the control signal generator 30 output to preserve the true RMS current as explained above. During the time between a pulse from the synchronization circuit 32 and the unclamping of the capacitor 62 by the compensation circuit 44, the voltage across capacitor 52 continues to increase as explained above so that at the point when the transformer current reaches the next zero crossing and stops flowing, the analog switch 70 is turned off and the capacitor 62 commences a rapid discharge. A series of subsequent output signals from the control signal generator 30 are shown in the graph of FIG. 4C. As can be seen, the time at which the reference signal exceeds the signal from the output of the control signal generator 30 shifts to a later time in the half-cycle thus reducing the on-time of the comparator amplifier 88 to correct for the added current beyond the line voltage zero crossing point.

FIGS. 4A–4H show the relationship between various signals as discussed for a 40% power factor and an 80% reference signal. The circuit of this invention tends to correct the output of the control signal function generator each half cycle as the system power factor varies. Under conditions where the power factor of the circuit is a relative constant, the conduction sensing circuit 46 may be replaced by a fixed time delay signal generator which holds the output of the control signal generator 30 at a curve corresponding to the system power factor.

Line Synchronizing Circuit

Referring to FIG. 2, step-down transformer T1 produces a signal that is proportional to the sinusoidal line voltage. Resistor 140 and diode 142 are connected to the positive supply voltage 144 to produce a positive reference voltage to which one end of the secondary of the transformer T1 is connected. When the voltage across the transformer T1 is zero (during zero crossing of the line voltage) the transformer is biased such that transistor 146 will start turning on with any slight increase in voltage.

As the voltage of the transformer T1 goes positive, transistor 146 will be turned on. Conversely, when the transformer voltage goes negative, transistor 146 is turned off. Thus, transistor 146 turns on and off exactly as the sinusoidal line voltage goes positive and negative with transistions occurring during the zero crossing of the line voltage.

This operation of the transistor 146 drives an LED 148 of the optical coupler or light emitting diode-photosensitive transistor pair 150 to provide a square wave at input 152 of NAND gate 154. A second NAND gate 156 has an input 158 connected to a second input 160 of NAND gate 154. If the signal at inputs 158 and 160 is a "one," the square wave appears inverted at output 162 of gate 154 and inverted again at the output 164 of gate 156. Thus, the square wave and the inverted square wave drive the latch circuit consisting of two NAND gates 166 and 168. On the output of each of the gates 166 and 168, resistor-capacitor circuits 170–172 and 174–176 produce zero going pulses on inputs 178 and 180 of NAND gate 182 whenever gate 166 or 168 goes zero. Thus, a positive sync pulse appears at output 132 of gate 182 at each zero crossing of the line sinusoidal voltage.

Inverter 130 provides a zero going sync pulse at each zero crossing to initiate the noise filter consisting of a NAND gate 184, capacitor 186, resistors 188 and 190, diode 192 and inverter 194. As a zero pulse appears on input 196, a "one" appears at the output 198 of gate 184 and is transferred to the inverter 194 through capacitor 186. The inverter output 200 drops to "zero" and is tied back to input 202 of gate 184. This holds gate 184 high, and also clamps off input 160 and 158 of gates 154 and 156 so that noise pulses cannot actuate the latch. Input 204 of inverter 194 begins to go low as capacitor 186 charges through resistors 188 and 190. When the voltage at input 204 is sufficiently low, inverter output 200 goes high, and the latch circuit is again allowed to look at the input square wave. Thus, resistor 190 may be adjusted such that only a small window is existant near the zero crossing, and the chance that extraneous noise signals will operate the latch circuit is greatly reduced. The output of the synchronizing circuit appears on gate 182 and the inverted output through inverter 130. A square wave output appears on gate 166 that is available for circuit control.

The parameters of a number of the components of the disclosed embodiment of this invention for use with a 50–60 $H_z$ power source are as follows:

capacitor 52: 0.01 mfd
resistor 54: 51 K Ω
resistor 56: 200 K Ω
capacitor 62: 0.01 mfd
resistor 82: 750 K Ω
resistor 86: 100 K Ω
resistor 90: 100 K Ω
resistor 104: 15 K Ω
resistor 120: 27 K Ω
capacitor 126: 0.01 mfd
resistor 140: 10 K Ω
resistor 170: 47 K Ω
capacitor 172: 0.001 mfd
resistor 174: 47 K Ω
capacitor 176: 0.001 mfd
capacitor 186: 0.01 mfd
resistor 188: 510 K Ω
resistor 240: 100 K Ω
resistor 242: 15 K Ω
resistor 243: 560 K Ω
capacitor 246: 0.001 mfd
capacitor 268: 0.01 mfd
resistor 270: 27 Ω
resistor 272: 47 Ω
capacitor 276: 0.01 mfd
resistor 278: 27 Ω
resistor 280: 47 Ω

While in the foregoing there has been described a presently preferred embodiment of the present invention, it should be understood that this embodiment is merely illustrative of this invention and that other embodiments may be made without departing from the true spirit and scope of this invention.

What is claimed is:

1. In a welding circuit having a transformer welding electrodes connected to the secondary of the transformer and an AC voltage source connected to the primary of the transformer, an improvement for regulating current in said primary winding comprising:
a synchronizing circuit means for generating a signal in fixed phase relationship with the zero crossings of the signal from said AC voltage source;
means for generating a nonlinear control signal in synchronism with the signal from said synchronizing circuit, said control signal having a decelerating negative slope during one portion thereof and an accelerating negative slope during a second portion thereof;
a conduction sensing circuit means for generating a conduction signal indicative of whether or not a voltage exists across said primary;
a compensation circuit means responsive to said synchronizing signal and said conduction signal for temporarily clamping the initial output level of said control signal during the times between the zero crossings of the voltage from said AC voltage source and the next interruption of current through said primary;
means for comparing said nonlinear control signal with a reference signal and for generating a switching signal indicative of whether or not said control signal is less than said reference signal; and
first switch means responsive to said switching signal for permitting current to flow between said AC voltage source and said primary in response to said switching signal.

2. The invention as claimed in claim 1 wherein said means for generating a nonlinear control signal comprises a first voltage follower amplifier, a second voltage follower amplifier, an energy storage means between the output of said first amplifier and the positive input of said second amplifier, a resistor connected between the output of said second amplifier and the positive input of said first amplifier, a second energy storage means connected between the input of said first amplifier and a reference potential, and second switch means for de-energizing said first energy storage means responsive to the signal from said synchronizing circuit and third switch means responsive to said synchronizing circuit for energizing said second energy storage means to a predetermined initial level.

3. The combination as set forth in claim 2 wherein said first and second energy storage means comprise first and second capacitors respectively and including a resistor and diode in parallel therewith connected between the positive input of said second amplifier and a first DC voltage source, said diode connected to conduct positive current toward said first capacitor, and also including a second DC voltage source having a voltage greater than said first DC voltage source connectable through said third switch means to said second capacitor for initially charging said second capacitor to the level of said second DC voltage source.

4. The invention as set forth in claim 1 wherein said compensation circuit includes gating means having inputs thereto connected to the outputs of said synchronizing circuit, said comparing means and said conduction sensing circuit for generating a compensation signal only during the time periods between a zero crossing of the signal from said AC voltage source and the next interruption of current through said primary by said first switch means.

5. In a transformer circuit having a primary winding, a secondary winding and an AC voltage source for delivering a signal therefrom connected to the primary winding, an improvement for regulating current in said primary winding comprising:
a synchronizing circuit means for generating a signal in fixed phase relationship with the zero crossings of the signal from said AC voltage source;
means for generating a non-linear control signal in synchronism with the zero crossings of the signal from said AC voltage source, said control signal having a decelerating negative slope during one portion of said signal and an accelerating negative slope during a second portion of said signal and approaching a constant during the latter part of said second portion, said means for generating said nonlinear control signal comprising a first voltage follower amplifier, a second voltage follower amplifier, an energy storage means between the output of said first amplifier and the positive input of said second amplifier, a resistor connected between the output of said second amplifier and the positive input of said first amplifier, a second energy storage means connected between the input of said first amplifier and a reference potential, and second switch means for deenergizing said first energy storage means responsive to the signal from said synchronizing circuit and third switch means responsive to said synchronizing circuit for energizing said second energy storage means to a predetermined initial level;

means for comparing said nonlinear control signal with a reference signal and for generating a switching signal indicative of whether or not said control signal is greater than said reference signal; and first switch means responsive to said switching signal for permitting current to flow between said AC voltage source and said primary winding in response to the switching signal from said comparing means.

6. The invention as set forth in claim 5 including a compensation circuit means synchronized with the zero crossings of the signal from said AC voltage source for temporarily clamping the initial energy level of said second energy storage means at a constant.

7. The combination as set forth in claim 6 including conduction sensing circuit means for unclamping the energy level of said second energy storage means when the current through said primary is next interrupted in response to the opening of said first switch means.

* * * * *